US011082591B2

(12) United States Patent
Siminoff et al.

(10) Patent No.: US 11,082,591 B2
(45) Date of Patent: Aug. 3, 2021

(54) SOLAR-CHARGING MOUNTING BRACKET FOR AUDIO/VIDEO RECORDING AND COMMUNICATION DEVICES (71) Applicant: Ring Inc., Santa Monica, CA (US)

(72) Inventors: James Siminoff, Pacific Palisades, CA (US); Spiro Sacre, Los Angeles, CA (US); Robert Tso, Hawthorne, CA (US); Christopher Loew, Palo Alto, CA (US); Mark Siminoff, Mountain View, CA (US); Matthew J. England, Santa Monica, CA (US)

(73) Assignee: Amazon Technologies, Inc., Seattle, WA (US)

( * ) Notice: Subject to any disclaimer, the term of this patent is extended or adjusted under 35 U.S.C. 154(b) by 220 days.

(21) Appl. No.: 15/905,718

(22) Filed: Feb. 26, 2018

(65) Prior Publication Data
US 2018/0255216 A1 Sep. 6, 2018

Related U.S. Application Data (60) Provisional application No. 62/466,623, filed on Mar. 3, 2017.

(51) Int. Cl.
*H04N 5/20* (2006.01)
*H04N 7/18* (2006.01)
*H02J 7/35* (2006.01)
*H04N 5/225* (2006.01)
*H04N 5/232* (2006.01)
(Continued)

(52) U.S. Cl.
CPC ............ *H04N 5/2253* (2013.01); *H02J 7/35* (2013.01); *H02S 99/00* (2013.01); *H04N 5/2251* (2013.01); *H04N 5/23241* (2013.01); *H04N 7/186* (2013.01); *H02J 7/00* (2013.01)

(58) Field of Classification Search
USPC ........................................................ 348/143
See application file for complete search history.

(56) References Cited

U.S. PATENT DOCUMENTS

| | | |
|---|---|---|
| 4,764,953 A | 8/1988 | Chern et al. |
| 5,428,388 A | 6/1995 | von Bauer et al. |
| 5,760,848 A | 6/1998 | Cho |

(Continued)

FOREIGN PATENT DOCUMENTS

| | | |
|---|---|---|
| CN | 2585521 Y | 11/2003 |
| CN | 2792061 Y | 6/2006 |

(Continued)

OTHER PUBLICATIONS

Kang, Hee Gok, International Search Report and Written Opinion of the International Searching Authority for PCT/US/2018/019783, dated Jun. 1, 2018, International Application Division, Korean Intellectual Property Office, Republic of Korea.

*Primary Examiner* — Mikhail Itskovich
(74) *Attorney, Agent, or Firm* — Lathrop GPM LLP (57) ABSTRACT Some aspects of the present embodiments provide a mounting bracket for automatically charging one or more rechargeable batteries of an audio/video (A/V) recording and communication device. The mounting bracket of some of the present embodiments includes one or more integrated solar panels that generate the electrical power for charging the rechargeable battery(ies) of the A/V recording and communication device.

20 Claims, 6 Drawing Sheets (51) Int. Cl.
*H02S 99/00* (2014.01)
*H02J 7/00* (2006.01)

(56) References Cited

U.S. PATENT DOCUMENTS

| | | | |
|---|---|---|---|
| 6,072,402 A | 6/2000 | Kniffin et al. | |
| 6,192,257 B1 | 2/2001 | Ray | |
| 6,271,752 B1 | 8/2001 | Vaios | |
| 6,429,893 B1 | 8/2002 | Xin | |
| 6,456,322 B1 | 9/2002 | Marinacci | |
| 6,476,858 B1 | 11/2002 | Ramirez Diaz et al. | |
| 6,633,231 B1 | 10/2003 | Okamoto et al. | |
| 6,658,091 B1 | 12/2003 | Naidoo et al. | |
| 6,753,774 B2 | 6/2004 | Pan et al. | |
| 6,970,183 B1 | 11/2005 | Monroe | |
| 7,062,291 B2 | 6/2006 | Ryley et al. | |
| 7,065,196 B2 | 6/2006 | Lee | |
| 7,085,361 B2 | 8/2006 | Thomas | |
| 7,109,860 B2 | 9/2006 | Wang | |
| 7,193,644 B2 | 3/2007 | Carter | |
| 7,304,572 B2 | 12/2007 | Sheynman et al. | |
| 7,382,249 B2 | 6/2008 | Fancella | |
| 7,450,638 B2 | 11/2008 | Iwamura | |
| 7,643,056 B2 | 1/2010 | Silsby | |
| 7,683,924 B2 | 3/2010 | Oh et al. | |
| 7,683,929 B2 | 3/2010 | Elazar et al. | |
| 7,738,917 B2 | 6/2010 | Ryley et al. | |
| 8,139,098 B2 | 3/2012 | Carter | |
| 8,144,183 B2 | 3/2012 | Carter | |
| 8,154,581 B2 | 4/2012 | Carter | |
| 8,619,136 B2 | 12/2013 | Howarter et al. | |
| 8,872,915 B1 | 5/2014 | Scalisi et al. | |
| 8,780,201 B1 | 7/2014 | Scalisi et al. | |
| 8,823,795 B1 | 9/2014 | Scalisi et al. | |
| 8,842,180 B1 | 9/2014 | Kasmir et al. | |
| 8,937,659 B1 | 1/2015 | Scalisi et al. | |
| 8,941,736 B1 | 1/2015 | Scalisi | |
| 8,947,530 B1 | 2/2015 | Scalisi | |
| 8,953,040 B1 | 2/2015 | Scalisi et al. | |
| 9,013,575 B2 | 4/2015 | Scalisi | |
| 9,049,352 B2 | 6/2015 | Scalisi et al. | |
| 9,053,622 B2 | 6/2015 | Scalisi | |
| 9,058,738 B1 | 6/2015 | Scalisi | |
| 9,060,103 B2 | 6/2015 | Scalisi | |
| 9,060,104 B2 | 6/2015 | Scalisi | |
| 9,065,987 B2 | 6/2015 | Scalisi | |
| 9,094,584 B2 | 7/2015 | Scalisi et al. | |
| 9,113,051 B1 | 8/2015 | Scalisi | |
| 9,113,052 B1 | 8/2015 | Scalisi et al. | |
| 9,118,819 B1 | 8/2015 | Scalisi et al. | |
| 9,142,214 B2 | 9/2015 | Scalisi | |
| 9,160,987 B1 | 10/2015 | Kasmir et al. | |
| 9,165,444 B2 | 10/2015 | Scalisi | |
| 9,172,920 B1 | 10/2015 | Kasmir et al. | |
| 9,172,921 B1 | 10/2015 | Scalisi et al. | |
| 9,172,922 B1 | 10/2015 | Kasmir et al. | |
| 9,179,107 B1 | 11/2015 | Scalisi | |
| 9,179,108 B1 | 11/2015 | Scalisi | |
| 9,179,109 B1 | 11/2015 | Kasmir et al. | |
| 9,196,133 B2 | 11/2015 | Scalisi et al. | |
| 9,197,867 B1 | 11/2015 | Scalisi et al. | |
| 9,230,424 B1 | 1/2016 | Scalisi et al. | |
| 9,237,318 B2 | 1/2016 | Kasmir et al. | |
| 9,247,219 B2 | 1/2016 | Kasmir et al. | |
| 9,253,455 B1 | 2/2016 | Harrison et al. | |
| 9,342,936 B2 | 5/2016 | Scalisi | |
| 9,508,239 B1 | 11/2016 | Harrison et al. | |
| 9,736,284 B2 | 8/2017 | Scalisi et al. | |
| 9,743,049 B2 | 8/2017 | Scalisi et al. | |
| 9,769,435 B2 | 9/2017 | Scalisi et al. | |
| 9,786,133 B2 | 10/2017 | Harrison et al. | |
| 9,799,183 B2 | 10/2017 | Harrison et al. | |
| 9,819,305 B2 * | 11/2017 | Blick | A61L 9/14 |
| 2002/0094111 A1 | 7/2002 | Puchek et al. | |
| 2002/0147982 A1 | 10/2002 | Naidoo et al. | |
| 2003/0043047 A1 | 3/2003 | Braun | |
| 2004/0085205 A1 | 5/2004 | Yeh | |
| 2004/0085450 A1 | 5/2004 | Stuart | |
| 2004/0086093 A1 | 5/2004 | Schranz | |
| 2004/0095254 A1 | 5/2004 | Maruszczak | |
| 2004/0135686 A1 | 7/2004 | Parker | |
| 2005/0111660 A1 | 5/2005 | Hosoda | |
| 2006/0010199 A1 | 1/2006 | Brailean et al. | |
| 2006/0022816 A1 | 2/2006 | Yukawa | |
| 2006/0139449 A1 | 6/2006 | Cheng et al. | |
| 2006/0156361 A1 | 7/2006 | Wang et al. | |
| 2007/0008081 A1 | 1/2007 | Tylicki et al. | |
| 2007/0183595 A1 | 8/2007 | Liu | |
| 2008/0123287 A1 * | 5/2008 | Rossell | G06F 1/1632 361/679.3 |
| 2010/0225455 A1 | 9/2010 | Claiborne et al. | |
| 2012/0286947 A1 | 11/2012 | Hsu | |
| 2013/0057695 A1 | 3/2013 | Huisking | |
| 2014/0090694 A1 * | 4/2014 | Bolanos | H01L 31/02013 136/251 |
| 2014/0267716 A1 | 9/2014 | Child et al. | |
| 2015/0124090 A1 | 5/2015 | Laceky et al. | |
| 2015/0163463 A1 | 6/2015 | Hwang et al. | |
| 2016/0330403 A1 | 11/2016 | Siminoff | |
| 2016/0376004 A1 * | 12/2016 | Claridge | B64C 19/00 701/3 |
| 2017/0025886 A1 * | 1/2017 | Rohmer | H02J 7/0044 |

FOREIGN PATENT DOCUMENTS

| | | |
|---|---|---|
| EP | 1480462 A1 | 11/2004 |
| GB | 2286283 A | 8/1995 |
| GB | 2354394 A | 3/2001 |
| GB | 2357387 A | 6/2001 |
| GB | 2400958 A | 10/2004 |
| JP | 2001-103463 A | 4/2001 |
| JP | 2002-033839 A | 1/2002 |
| JP | 2002-125059 A | 4/2002 |
| JP | 2002-342863 A | 11/2002 |
| JP | 2002-344640 A | 11/2002 |
| JP | 2002-354137 A | 12/2002 |
| JP | 2002-368890 A | 12/2002 |
| JP | 2003-283696 A | 10/2003 |
| JP | 2004-128835 A | 4/2004 |
| JP | 2005-341040 A | 12/2005 |
| JP | 2006-147650 A | 6/2006 |
| JP | 2006-262342 A | 9/2006 |
| JP | 2009-008925 A | 1/2009 |
| JP | 2011-030121 A | 2/2011 |
| WO | 0944883 A1 | 6/1998 |
| WO | 1998/39894 A1 | 9/1998 |
| WO | 2001/13638 A1 | 2/2001 |
| WO | 2001/93220 A1 | 12/2001 |
| WO | 2002/085019 A1 | 10/2002 |
| WO | 2003/028375 A1 | 4/2003 |
| WO | 2003/096696 A1 | 11/2003 |
| WO | 2006/038760 A1 | 4/2006 |
| WO | 2006/067782 A1 | 6/2006 |
| WO | 2007/125143 A1 | 8/2007 |

\* cited by examiner

SOLAR-CHARGING MOUNTING BRACKET FOR AUDIO/VIDEO RECORDING AND COMMUNICATION DEVICES

CROSS-REFERENCE TO RELATED APPLICATION

This application claims priority to provisional application Ser. No. 62/466,623, filed on Mar. 3, 2017, the entire contents of which are hereby incorporated by reference.

TECHNICAL FIELD

The present embodiments relate to audio/video (A/V) recording and communication devices (e.g., A/V recording and communication doorbell systems, A/V recording and communication security systems, etc.).

BACKGROUND

Home security is a concern for many homeowners and renters. Those seeking to protect or monitor their homes often wish to have video and audio communications with visitors, for example, those visiting an external door or entryway. Audio/Video (A/V) recording and communication devices, such as doorbells and security cameras, provide this functionality, and can also aid in crime detection and prevention. For example, audio and/or video captured by an A/V recording and communication device can be uploaded to the cloud and recorded on a remote server. Subsequent review of the A/V footage can aid law enforcement in capturing perpetrators of home burglaries and other crimes. Further, the presence of one or more A/V recording and communication devices on the exterior of a home, such as a doorbell unit at the entrance to the home, acts as a powerful deterrent against would-be burglars.

SUMMARY

The various embodiments of the present solar-charging mounting bracket for video doorbells have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

One aspect of the present embodiments includes the realization that recharging an A/V recording and communication device that is powered by a rechargeable battery can sometimes be a cumbersome process. For example, in some cases, when a video doorbell that is powered by a rechargeable battery runs out of power, the doorbell has to be unmounted (e.g., from an outside wall of a structure) and then connected to a power source, such as a USB port of a computer or a wall adapter (e.g., inside the structure), in order to be recharged. In some other cases, the rechargeable battery can be removed from the doorbell and charged separately (i.e., there is no need for unmounting the whole device from the wall). In both scenarios, however, during the charging period of the battery, the video doorbell may lose its functionality because it does not have a power source for powering its electronic components (e.g., when its battery is removed), or because it is moved from its original place (e.g., when the doorbell has to be unmounted and moved to another place).

It would be advantageous, therefore, if the video doorbell could retain its functionality during the charging period. That is, it would be advantageous if the rechargeable battery of a video doorbell, which is mounted (e.g., on a wall) using a mounting bracket, could be charged by the mounting bracket and without the need to remove the doorbell (or its battery) from the bracket. The present embodiments provide such an advantage by providing a mounting bracket with integrated solar panels. Such a mounting bracket automatically charges the rechargeable battery(ies) of an A/V recording and communication device using the electrical power generated by the solar panels.

In a first aspect, a mounting bracket for an audio/video (A/V) recording and communication device is provided, the mounting bracket comprising a rear surface configured to abut a mounting surface of a structure; a front surface including a receiving area configured to matingly receive the A/V recording and communication device; an upper surface adjacent an upper edge of the receiving area, the upper surface including an upper recess; left-side and right-side surfaces adjacent left-side and right-side edges, respectively, of the receiving area, the left-side and right-side surfaces including, respectively, a left-side recess and a right-side recess; an upper solar panel located within the upper recess; a left-side solar panel located within the left-side recess; a right-side solar panel located within the right-side recess; and a charging cable operatively connected to each of the upper solar panel, the left-side solar panel, and the right-side solar panel, wherein the charging cable includes a connector that is configured to mechanically and electrically couple the charging cable to the A/V recording and communication device.

In an embodiment of the first aspect, the receiving area includes a plurality of hooks configured to engage with a plurality of apertures on a rear surface of the A/V recording and communication device to mechanically couple the A/V recording and communication device to the mounting bracket.

In another embodiment of the first aspect, the receiving area includes a plurality of apertures configured to receive mounting hardware to secure the mounting bracket to the mounting surface of the structure.

In another embodiment of the first aspect, the receiving area includes a connector recess configured to accommodate the connector of the charging cable.

In another embodiment of the first aspect, the connector of the charging cable comprises a micro-USB connector.

In another embodiment of the first aspect, the receiving area includes a receiving area recess configured to accommodate a protrusion on a rear surface of the A/V recording and communication device.

In another embodiment of the first aspect, the protrusion comprises a reset button.

In another embodiment of the first aspect, the receiving area includes an electrically conductive contact plate.

In another embodiment of the first aspect, the electrically conductive contact plate is located within a contact plate recess in the receiving area.

In another embodiment of the first aspect, the contact plate is coupled to at least one of a plurality of pins located on a rear surface of the A/V recording and communication device to indicate to the A/V recording and communication device that electrical power is being received from the solar panels.

In another embodiment of the first aspect, the A/V recording and communication device is a doorbell.

In another embodiment of the first aspect, the A/V recording and communication device is a security camera.

In another embodiment of the first aspect, the structure is a dwelling.

In a second aspect, a mounting bracket for an audio/video (A/V) recording and communication device is provided, the mounting bracket comprising a rear surface configured to abut a mounting surface of a structure; a front surface including a receiving area configured to matingly receive the A/V recording and communication device; an upper surface adjacent an upper edge of the receiving area, the upper surface comprising an upper solar panel; left-side and right-side surfaces adjacent left-side and right-side edges, respectively, of the receiving area, the left-side and right-side surfaces comprising, respectively, a left-side solar panel and a right-side solar panel; and a charging cable operatively connected to each of the upper solar panel, the left-side solar panel, and the right-side solar panel, wherein the charging cable comprises a connector configured to mechanically and electrically couple the charging cable to the A/V recording and communication device.

In an embodiment of the second aspect, the upper surface comprises an upper recess that accommodates the upper solar panel.

In another embodiment of the second aspect, the left-side and right-side surfaces comprise left-side and right-side recesses that accommodate the left-side solar panel and the right-side solar panel, respectively.

In another embodiment of the second aspect, the receiving area includes a plurality of hooks configured to engage with a plurality of apertures on a rear surface of the A/V recording and communication device to mechanically couple the A/V recording and communication device to the mounting bracket.

In another embodiment of the second aspect, the receiving area includes a plurality of apertures configured to receive mounting hardware to secure the mounting bracket to the mounting surface of the structure.

In another embodiment of the second aspect, the receiving area includes a connector recess configured to accommodate the connector of the charging cable.

In another embodiment of the second aspect, the connector of the charging cable comprises a micro-USB connector.

In another embodiment of the second aspect, the receiving area includes a receiving area recess configured to accommodate a protrusion on a rear surface of the A/V recording and communication device.

In another embodiment of the second aspect, the protrusion comprises a reset button.

In another embodiment of the second aspect, the receiving area includes an electrically conductive contact plate.

In another embodiment of the second aspect, the electrically conductive contact plate is located within a contact plate recess in the receiving area.

In another embodiment of the second aspect, the contact plate is coupled to at least one of a plurality of pins located on a rear surface of the A/V recording and communication device to indicate to the A/V recording and communication device that electrical power is being received from the solar panels.

In another embodiment of the second aspect, the A/V recording and communication device is a doorbell.

In another embodiment of the second aspect, the A/V recording and communication device is a security camera.

In another embodiment of the second aspect, the structure is a dwelling.

In a third aspect, a mounting bracket for an audio/video (A/V) recording and communication device is provided, the mounting bracket comprising a rear surface configured to abut a mounting surface; a front surface comprising a receiving area configured to couple to the A/V recording and communication device; an upper surface comprising a first solar panel; left-side and right-side surfaces comprising, respectively, a left-side solar panel and a right-side solar panel; and a charging cable operatively connected to each of the upper solar panel, the left-side solar panel, and the right-side solar panel, wherein the solar panels provide power to the A/V recording and communication device through the charging cable.

In an embodiment of the third aspect, the mounting surface comprises one of a door and a wall of a structure.

In another embodiment of the third aspect, the structure comprises one of a residential building and a commercial building.

In another embodiment of the third aspect, the upper surface is adjacent an upper edge of the receiving area.

In another embodiment of the third aspect, the upper surface comprises an upper recess that accommodates the upper solar panel.

In another embodiment of the third aspect, the left-side and right-side surfaces are adjacent, respectively, left-side and right-side edges of the receiving area.

In another embodiment of the third aspect, the left-side and right-side surfaces comprise left-side and right-side recesses that accommodate the left-side solar panel and the right-side solar panel, respectively.

In another embodiment of the third aspect, the charging cable comprises a connector configured to mechanically and electrically couple the charging cable to the A/V recording and communication device.

In another embodiment of the third aspect, the receiving area comprises a connector recess configured to accommodate the connector of the charging cable.

In another embodiment of the third aspect, the connector of the charging cable comprises a micro-USB connector.

In another embodiment of the third aspect, the receiving area comprises a plurality of hooks configured to engage with a plurality of apertures on a rear surface of the A/V recording and communication device to mechanically couple the A/V recording and communication device to the mounting bracket.

In another embodiment of the third aspect, the receiving area comprises a plurality of apertures configured to receive mounting hardware to secure the mounting bracket to the mounting surface.

In another embodiment of the third aspect, the receiving area includes a receiving area recess configured to accommodate a protrusion on a rear surface of the A/V recording and communication device.

In another embodiment of the third aspect, the protrusion comprises a reset button.

In another embodiment of the third aspect, the receiving area comprises an electrically conductive contact plate.

In another embodiment of the third aspect, the electrically conductive contact plate is located within a contact plate recess in the receiving area.

In another embodiment of the third aspect, the contact plate is coupled to at least one of a plurality of pins located on a rear surface of the A/V recording and communication device to indicate to the A/V recording and communication device that electrical power is being received from the solar panels.

In another embodiment of the third aspect, the A/V recording and communication device is a doorbell.

In another embodiment of the third aspect, the A/V recording and communication device is a security camera.

BRIEF DESCRIPTION OF THE DRAWINGS

The various embodiments of the present solar-charging mounting bracket for video doorbells now will be discussed in detail with an emphasis on highlighting the advantageous features. These embodiments depict the novel and non-obvious solar-charging mounting bracket for video doorbells shown in the accompanying drawings, which are for illustrative purposes only. These drawings include the following figures, in which like numerals indicate like parts.

DETAILED DESCRIPTION

The following detailed description describes the present embodiments with reference to the drawings. In the drawings, reference numbers label elements of the present embodiments. These reference numbers are reproduced below in connection with the discussion of the corresponding drawing features.

The embodiments of the present solar-charging mounting bracket for audio/video (A/V) recording and communication devices (e.g., video doorbells and/or security cameras) are described below with reference to the figures. These figures, and their written descriptions, indicate that certain components of the apparatus are formed integrally, and certain other components are formed as separate pieces. Those of ordinary skill in the art will appreciate that components shown and described herein as being formed integrally may in alternative embodiments be formed as separate pieces. Those of ordinary skill in the art will further appreciate that components shown and described herein as being formed as separate pieces may in alternative embodiments be formed integrally. Further, as used herein the term integral describes a single unitary piece.

Figure 1:
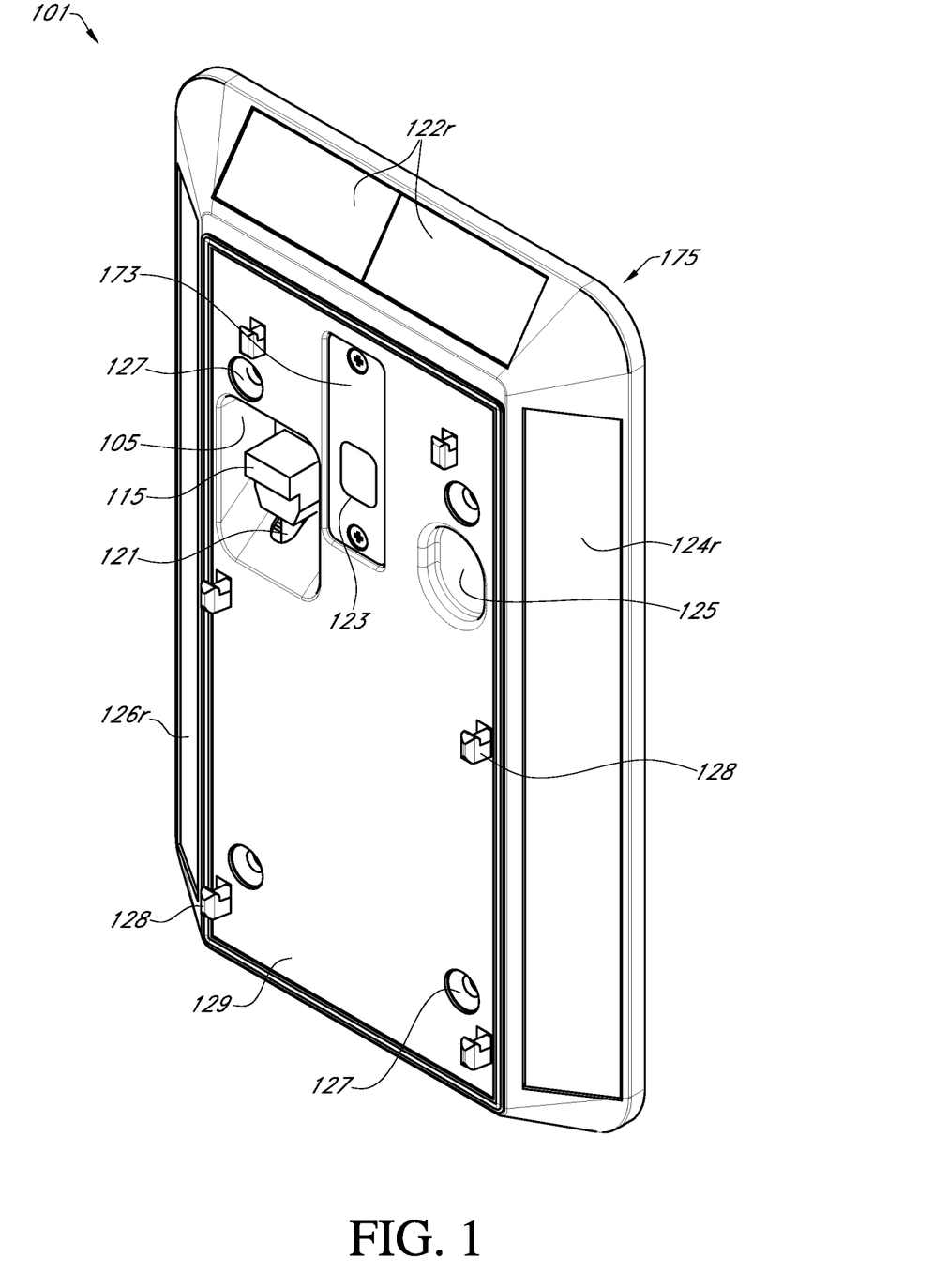
FIG. 1 is a front perspective view of one embodiment of a solar-charging mounting bracket for audio/video (A/V) recording and communication devices according to various aspects of the present disclosure.

With reference to FIG. 1, the present embodiments include a mounting bracket 101 with integrated solar panels. The mounting bracket 101, as described in detail below with reference to FIG. 2, automatically charges the rechargeable battery(ies) of a video doorbell 130 (or another type of A/V recording and communication device) using electrical power generated by the solar panels of the mounting bracket. While the present disclosure provides numerous examples including A/V recording and communication doorbells, the present embodiments are equally applicable for A/V recording and communication devices other than doorbells. For example, the present embodiments may be used in connection with A/V recording and communication security cameras instead of, or in addition to, A/V recording and communication doorbells. An example A/V recording and communication security camera may include substantially all of the structure and/or functionality of the doorbells described herein, except the front button and its related components.

FIG. 1 illustrates a front perspective view of one embodiment of a solar-charging mounting bracket 101 for A/V recording and communication devices according to various aspects of the present disclosure. In the illustrated embodiment, the front, top, left, and right surfaces of the mounting bracket 101 are shown. The front surface of the mounting bracket 101 includes a receiving area 129, a plurality of hooks 128, a conductive contact plate 123, a connector recess 105, a contact plate recess 173, a receiving area recess 125, and a plurality of apertures 127. The apertures 127 are configured to receive mounting hardware (e.g., screws) to secure the mounting bracket 101 to a mounting surface (e.g., a wall, a door, a gate, etc. of a structure).

The mounting bracket 101, in some embodiments, may include a substantially flat rear surface 175, such that an assembly comprising the mounting bracket and a doorbell may sit flush against the surface to which it is mounted. The mounting bracket 101 may be mounted to surfaces of various composition, including, without limitation, wood, concrete, stucco, brick, vinyl siding, aluminum siding, etc., with any suitable fasteners, such as screws (e.g., through the apertures 127), or other interference connections, adhesives, etc.

Figure 2:
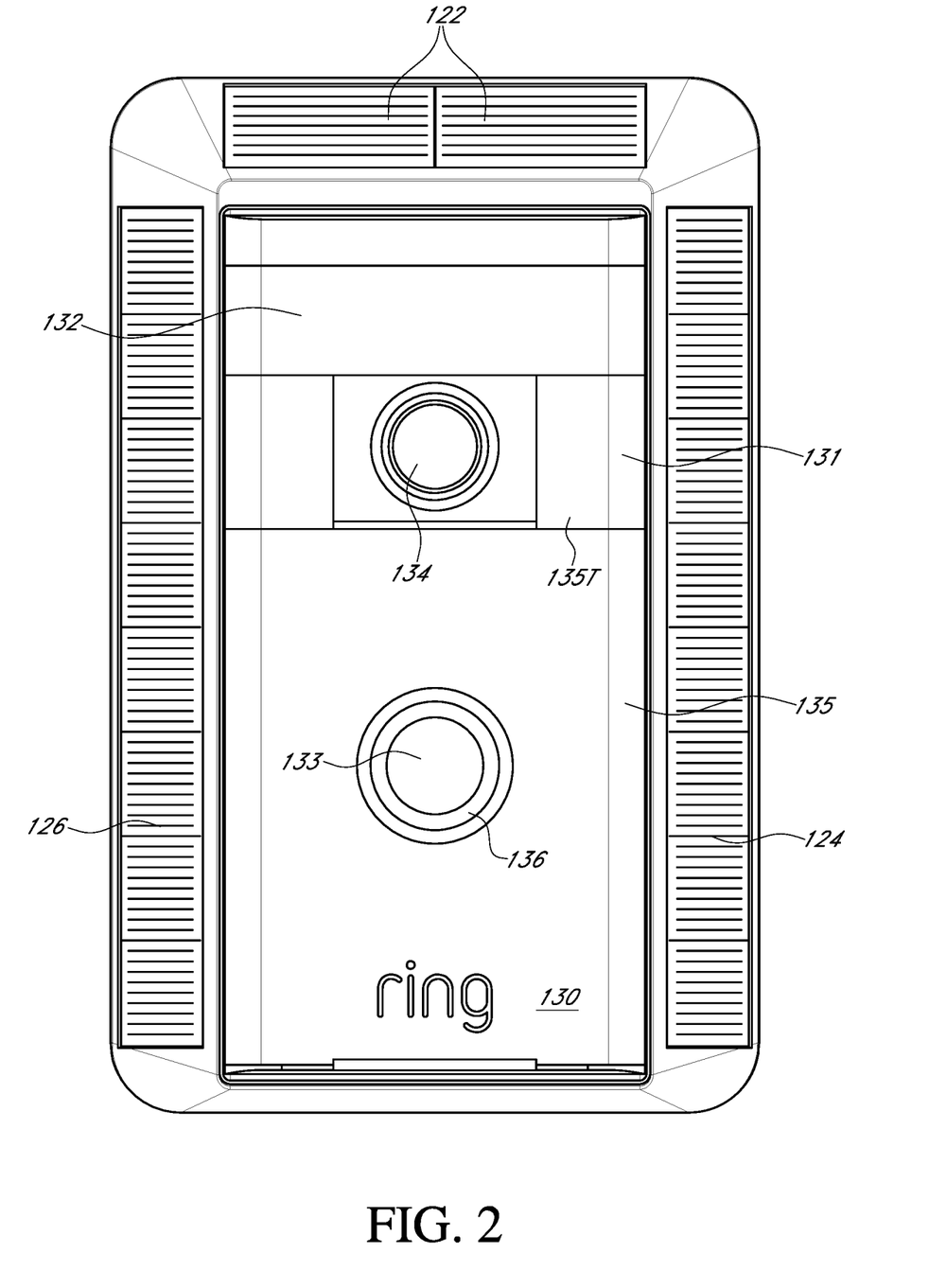
FIG. 2 is a front perspective view of the solar-charging mounting bracket for A/V recording and communication devices of FIG. 1 with a video doorbell mounted thereon.

The receiving area 129 of the front surface of the mounting bracket 101 is configured to be coupled with the video doorbell 130 as shown in FIG. 2. In some embodiments, each hook 128 of the receiving area 129 engages with a corresponding aperture on a rear surface of the video doorbell 130 to mechanically couple the doorbell 130 to the mounting bracket 101. Instead of, or in conjunction with, the hooks 128, other embodiments may use other suitable fasteners, such as screws, interference connections, adhesives, etc. to couple the video doorbell 130 with the mounting bracket 101. Interference connections, in some embodiments, may refer to a type of connection where a material relies on pressure and/or gravity coupled with the material's physical strength to support a connection to a different element.

In some embodiments, the front surface/receiving area 129 includes a receiving area recess 125 to accommodate a reset button 159 (FIG. 6) protruding from the rear surface of the video doorbell 130. In some embodiments, when the reset button 159 is pressed, a particular module may be triggered to perform one or more functions for the doorbell. As an example, when a reset button 159 of some embodiments is pressed, a communication module may be triggered to erase any data stored at a non-volatile memory and/or at a volatile memory of the doorbell 130.

The receiving area 129 of the mounting bracket 101, in some embodiments, also includes an electrically conductive contact plate 123 located within a contact plate recess 173. The contact plate 123 is configured to electrically couple to one or more spring pins (not shown) protruding from the rear surface of the doorbell 130. The contact plate 123 may comprise any suitable conductive material, including, without limitation, copper, and may protrude slightly from the contact plate recess 173 of the mounting bracket 101 so that it may mate with the spring pins of the doorbell 130. In some embodiments, electrical contact between at least one of the spring pins and the contact plate 123 may indicate to a power management module 162 (FIG. 6) of the video doorbell 130 that electrical power for recharging a rechargeable battery 166 (FIG. 6) of the video doorbell 130 is to be received from the solar panels (as opposed to, e.g., an AC power source).

The mounting bracket 101 also includes a charging cable 121 in some embodiments. The charging cable 121 includes, at a first end, a connector 115. At a second end opposite the first end, the charging cable 121 is connected to the solar panels that are located on upper, left, and right surfaces of the mounting bracket 101. The connector 115, in some embodiments, may comprise a micro-USB (Universal Serial Bus) connector that couples to a micro-USB port (not shown) of the video doorbell 130. Through this micro-USB port, the charging cable 121 recharges the battery 166 of the doorbell 130 with electrical power received from the solar panels located on the sides and upper surfaces of the mounting bracket 101. In some embodiments, in addition to providing power, other data can also be communicated to/from the video doorbell 130 through the micro-USB port of the doorbell 130. The charging cable 121 and connector 115 are accommodated in a connector recess 105 of the receiving area 129 such that they do not protrude from the receiving area 129.

As shown in FIG. 1, the mounting bracket 101 also includes recesses 122r, 124r, 126r, on its upper, right, and left sides, respectively, that each accommodate a corresponding solar panel. Specifically, the upper solar panel 122 is located within the upper recess 122r, the left-side solar panel 126 is located within the left-side recess 126r, and the right-side solar panel 124 is located within the right-side recess 124r of the mounting bracket 101.

FIG. 2 illustrates a front perspective view of the solar-charging mounting bracket 101 for A/V recording and communication devices of the present embodiments with a video doorbell 130 mounted thereon. The video doorbell 130 is coupled to the mounting bracket 101, e.g., using the hooks 128 of the mounting bracket 101 and apertures located on the rear surface of the video doorbell 130. The mounting bracket 101 provides the required power for charging the rechargeable battery 166 of the video doorbell 130 through the solar panels 122, 124, and 126, located, respectively, on the top, right, and left surfaces of the mounting bracket 101. Some of the components of the video doorbell 130 are described with reference to FIG. 2. However, the functionality of the video doorbell 130, as well as its different modules, are described in more detail below with reference to FIGS. 4-6.

With reference to FIG. 2, the front of the video doorbell 130 includes a front button 133, a faceplate 135, and a light pipe 136. The button 133 may make contact with a button actuator (not shown) located within the doorbell 130 when the button 133 is pressed by a visitor. When pressed, the button 133 may trigger one or more functions of the doorbell 130, as further described below. The front button 133 and the light pipe 136 may have various profiles that may or may not match the profile of the faceplate 135. The light pipe 136 may comprise any suitable material, including, without limitation, transparent plastic, that is capable of allowing light produced within the doorbell 130 to pass through. The light may be produced by one or more light-emitting components, such as light-emitting diodes (LED's) 156 (FIG. 6), contained within the doorbell 130.

In some embodiments, when the battery 166 of the doorbell 130 is recharged through a connection to AC mains power, the LEDs 156 may emit light to indicate that the battery 166 is being recharged. In the present embodiments, electrical contact between the contact plate 123 and at least one of the pins on the rear surface of the doorbell 130 may indicate to the power management module 162 (FIG. 6) that the battery 166 is being recharged by electrical power received from the solar panels 122, 124, 126 of the mounting bracket, rather than by AC mains power, so that the LEDs 156 do not emit any light in connection with the battery recharging, thereby conserving power so that the electrical power received from the solar panels 122, 124, 126 is not consumed by illuminating the LEDs 156.

With further reference to FIG. 2, the doorbell 130 further includes an enclosure 131 that engages the faceplate 135 in some embodiments. In the illustrated embodiment, the enclosure 131 abuts an upper edge 135T of the faceplate 135, but in alternative embodiments one or more gaps between the enclosure 131 and the faceplate 135 may facilitate the passage of sound and/or light through the doorbell 130. The enclosure 131 may comprise any suitable material, but in some embodiments the material of the enclosure 131 preferably permits infrared light to pass through from inside the doorbell 130 to the environment and vice versa. The doorbell 130 further includes a lens 132. In some embodiments, the lens may comprise a Fresnel lens, which may be patterned to deflect incoming light into one or more infrared sensors located within the doorbell 130. The doorbell 130 further includes a camera 134, which captures video data when activated, as described below.

Figure 3:
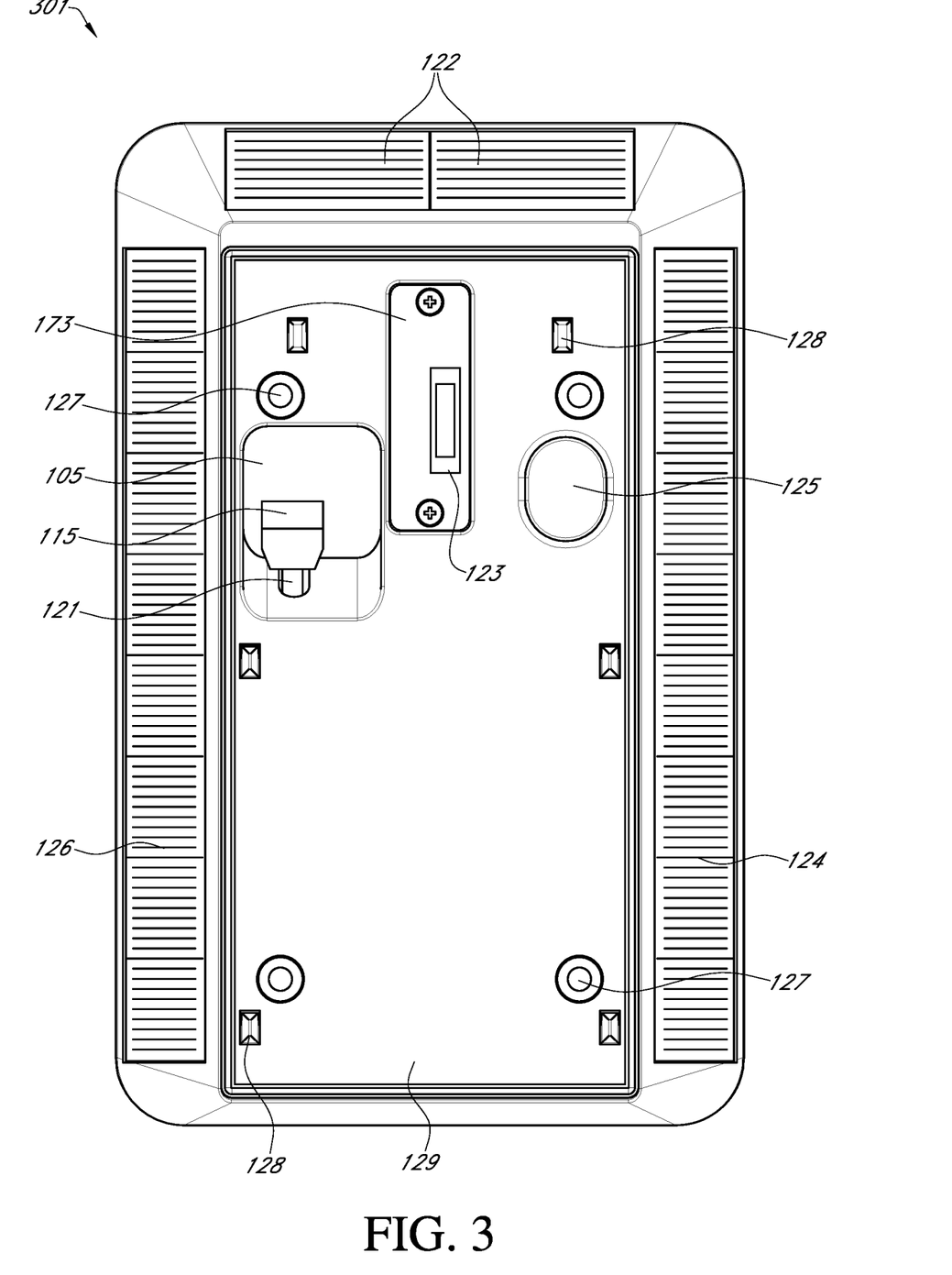
FIG. 3 is a front view of the solar-charging mounting bracket for A/V recording and communication devices of FIG. 1.

FIG. 3 illustrates a front view of the solar-charging mounting bracket 101 for A/V recording and communication devices according to various aspects of the present embodiments. This figure shows the same elements of the mounting bracket 101 shown in FIG. 1, but from a different perspective. More specifically, FIG. 3 illustrates the receiving area 129, the hooks 128, the conductive contact plate 123, the connector recess 105, the contact plate recess 173, the receiving area recess 125, and the apertures 127 shown in FIG. 1 from the front view. As described above, the receiving area 129 of the mounting bracket 101 is configured to be coupled with the video doorbell 130 (and/or with another video doorbell having a different configuration, and/or with another type of A/V recording and communication device, such as a security camera).

Figure 4:
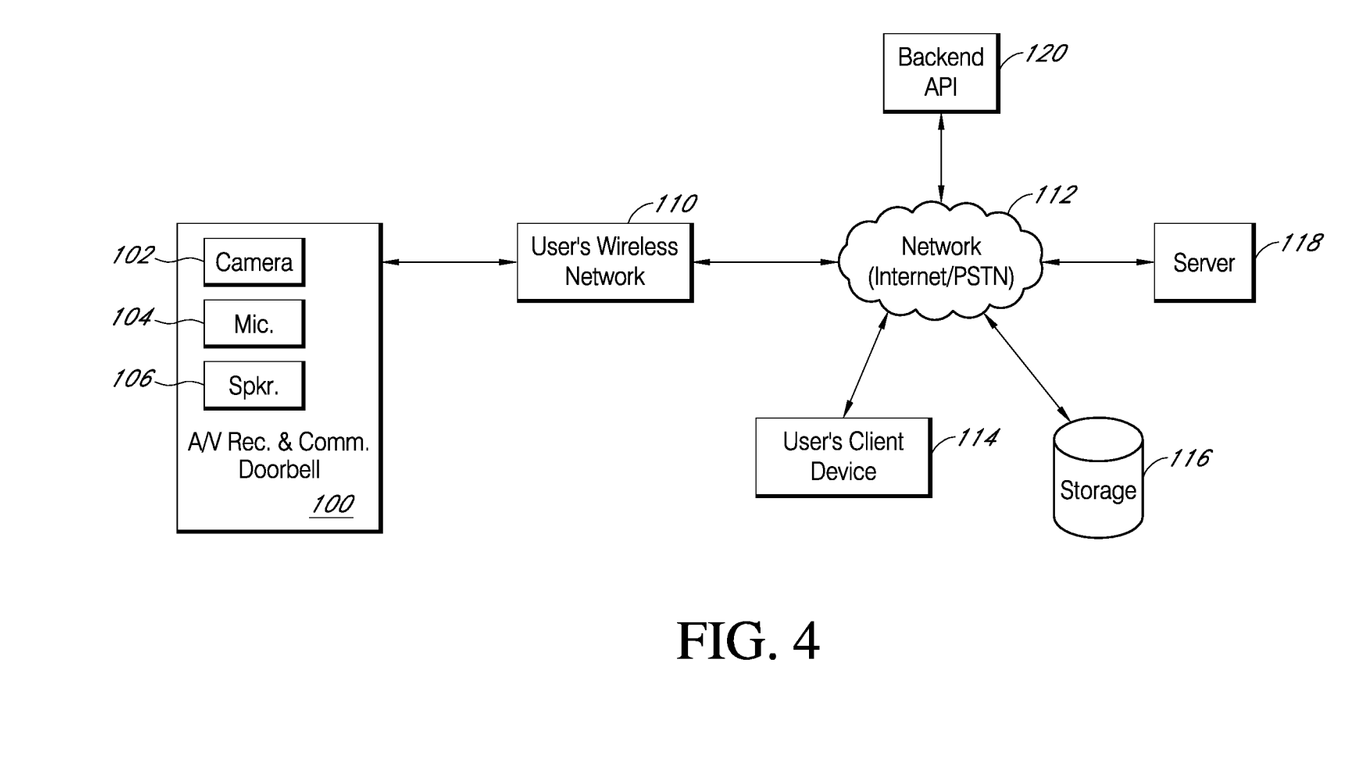
FIG. 4 is a functional block diagram illustrating a system including an A/V recording and communication device according to various aspects of the present embodiments.

FIG. 4 illustrates a functional block diagram of a system including an A/V recording and communication device according to various aspects of the present embodiments. The A/V recording and communication device 100 may be located near the entrance to a structure (not shown), such as a dwelling, a business, a storage facility, etc. The A/V recording and communication device 100 includes a camera 102, a microphone 104, and a speaker 106. The camera 102 may comprise, for example, a high definition (HD) video camera, such as one capable of capturing video images at an image display resolution of 1080p or better. While not shown, the A/V recording and communication device 100 may also include other hardware and/or components, such as a housing, a communication module (which may facilitate wired and/or wireless communication with other devices), one or more motion sensors (and/or other types of sensors), a button, etc. The A/V recording and communication device 100 may further include similar componentry and/or functionality as the wireless communication doorbells described in US Patent Application Publication Nos. 2015/0022620 (application Ser. No. 14/499,828) and 2015/0022618 (application Ser. No. 14/334,922), both of which are incorporated herein by reference in their entireties as if fully set forth.

With further reference to FIG. 4, the A/V recording and communication device 100 communicates with a user's network 110, which may be for example a wired and/or wireless network. If the user's network 110 is wireless, or includes a wireless component, the network 110 may be a Wi-Fi network compatible with the IEEE 802.11 standard and/or other wireless communication standard(s). The user's network 110 is connected to another network 112, which may comprise, for example, the Internet and/or a public switched telephone network (PSTN).

As described below, the A/V recording and communication device 100 may communicate with the user's client device 114 via the user's network 110 and the network 112 (Internet/PSTN). The user's client device 114 may comprise, for example, a mobile telephone (may also be referred to as a cellular telephone), such as a smartphone, a personal digital assistant (PDA), or another communication device. The user's client device 114 comprises a display (not shown) and related components capable of displaying streaming and/or recorded video images. The user's client device 114 may also comprise a speaker and related components capable of broadcasting streaming and/or recorded audio, and may also comprise a microphone. The A/V recording and communication device 100 may also communicate with one or more remote storage device(s) 116 (may be referred to interchangeably as "cloud storage device(s)"), one or more servers 118, and/or a backend API (application programming interface) 120 via the user's network 110 and the network 112 (Internet/PSTN). While FIG. 4 illustrates the storage device 116, the server 118, and the backend API 120 as components separate from the network 112, it is to be understood that the storage device 116, the server 118, and/or the backend API 120 may be considered to be components of the network 112.

The network 112 may be any wireless network or any wired network, or a combination thereof, configured to operatively couple the above mentioned modules, devices, and systems For example, the network 112 may include one or more of the following: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), LTE, VoLTE, LoRaWAN, LPWAN, RPMA, LTE Cat-"X" (e.g. LTE Cat 1, LTE Cat 0, LTE CatM1, LTE Cat NB1), CDMA (Code Division Multiple Access), TDMA (Time Division Multiple Access), FDMA (Frequency Division Multiple Access), and/or OFDMA (Orthogonal Frequency Division Multiple Access) cellular phone networks, GPS, CDPD (cellular digital packet data), RIM (Research in Motion, Limited) duplex paging network, Bluetooth radio, or an IEEE 802.11-based radio frequency network. The network can further include or interface with any one or more of the following: RS-232 serial connection, IEEE-1394 (Firewire) connection, Fibre Channel connection, IrDA (infrared) port, SCSI (Small Computer Systems Interface) connection, USB (Universal Serial Bus) connection, or other wired or wireless, digital or analog, interface or connection, mesh or Digi® networking.

According to one or more aspects of the present embodiments, when a person (may be referred to interchangeably as "visitor") arrives at the A/V recording and communication device 100, the A/V recording and communication device 100 detects the visitor's presence and begins capturing video images within a field of view of the camera 102. The A/V communication device 100 may also capture audio through the microphone 104. The A/V recording and communication device 100 may detect the visitor's presence by detecting motion using the camera 102 and/or a motion sensor, and/or by detecting that the visitor has pressed a front button of the A/V recording and communication device 100 (if the A/V recording and communication device 100 is a doorbell).

In response to the detection of the visitor, the A/V recording and communication device 100 sends an alert to the user's client device 114 (FIG. 4) via the user's network 110 and the network 112. The A/V recording and communication device 100 also sends streaming video, and may also send streaming audio, to the user's client device 114. If the user answers the alert, two-way audio communication may then occur between the visitor and the user through the A/V recording and communication device 100 and the user's client device 114. The user may view the visitor throughout the duration of the call, but the visitor cannot see the user (unless the A/V recording and communication device 100 includes a display, which it may in some embodiments).

The video images captured by the camera 102 of the A/V recording and communication device 100 (and the audio captured by the microphone 104) may be uploaded to the cloud and recorded on the remote storage device 116 (FIG. 4). In some embodiments, the video and/or audio may be recorded on the remote storage device 116 even if the user chooses to ignore the alert sent to his or her client device 114.

With further reference to FIG. 4, the system may further comprise a backend API 120 including one or more components. A backend API (application programming interface) may comprise, for example, a server (e.g. a real server, or a virtual machine, or a machine running in a cloud infrastructure as a service), or multiple servers networked together, exposing at least one API to client(s) accessing it. These servers may include components such as application servers (e.g. software servers), depending upon what other components are included, such as a caching layer, or database layers, or other components. A backend API may, for example, comprise many such applications, each of which communicate with one another using their public APIs. In some embodiments, the API backend may hold the bulk of the user data and offer the user management capabilities, leaving the clients to have very limited state.

The backend API 120 illustrated FIG. 4 may include one or more APIs. An API is a set of routines, protocols, and tools for building software and applications. An API expresses a software component in terms of its operations, inputs, outputs, and underlying types, defining functionalities that are independent of their respective implementations, which allows definitions and implementations to vary without compromising the interface. Advantageously, an API may provide a programmer with access to an application's functionality without the programmer needing to modify the application itself, or even understand how the application works. An API may be for a web-based system, an operating system, or a database system, and it provides facilities to develop applications for that system using a given programming language. In addition to accessing databases or computer hardware like hard disk drives or video cards, an API can ease the work of programming GUI components. For example, an API can facilitate integration of new features into existing applications (a so-called "plug-in API"). An API can also assist otherwise distinct applications with sharing data, which can help to integrate and enhance the functionalities of the applications.

The backend API 120 illustrated in FIG. 4 may further include one or more services (also referred to as network services). A network service is an application that provides data storage, manipulation, presentation, communication, and/or other capability. Network services are often implemented using a client-server architecture based on application-layer network protocols. Each service may be provided by a server component running on one or more computers (such as a dedicated server computer offering multiple services) and accessed via a network by client components running on other devices. However, the client and server components can both be run on the same machine. Clients and servers may have a user interface, and sometimes other hardware associated with them.

Figure 5:
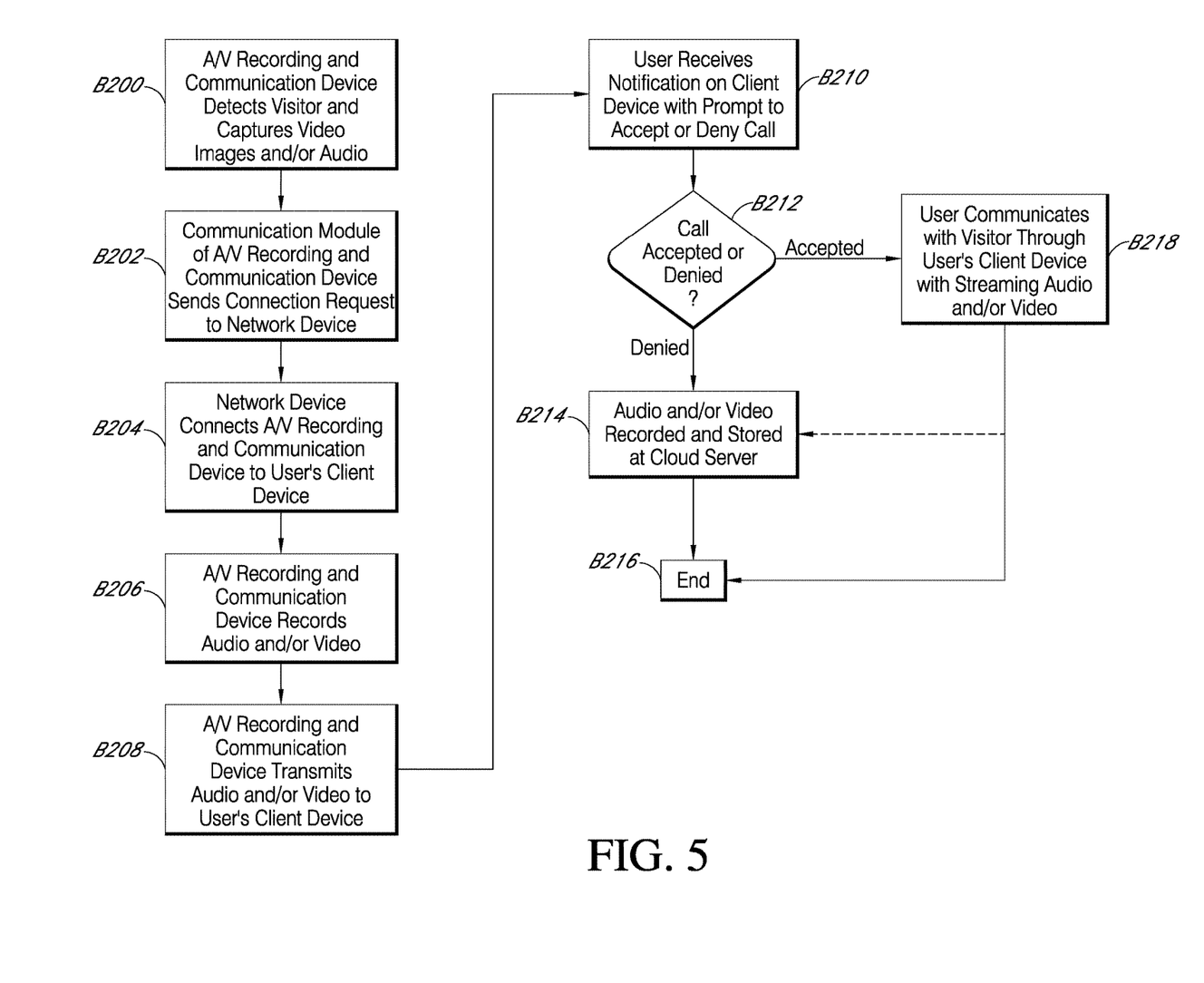
FIG. 5 is a flowchart illustrating a process for streaming and storing A/V content from an A/V recording and communication device according to various aspects of the present embodiments.

FIG. 5 is a flowchart illustrating a process for streaming and storing A/V content from the A/V recording and communication device 100 according to various aspects of the present disclosure. At block B200, the A/V recording and communication device 100 detects the visitor's presence and captures video images within a field of view of the camera 102. The A/V recording and communication device 100 may also capture audio through the microphone 104. As described above, the A/V recording and communication device 100 may detect the visitor's presence by detecting motion using the camera 102 and/or a motion sensor, and/or by detecting that the visitor has pressed a front button of the A/V recording and communication device 100 (if the A/V recording and communication device 100 is a doorbell). Also as described above, the video recording/capture may begin when the visitor is detected, or may begin earlier, as described below.

At block B202, a communication module of the A/V recording and communication device 100 sends a connection request, via the user's network 110 and the network 112, to a device in the network 112. For example, the network device to which the request is sent may be a server such as the server 118. The server 118 may comprise a computer program and/or a machine that waits for requests from other machines or software (clients) and responds to them. A server typically processes data. One purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes. In another example, the network device to which the request is sent may be an API such as the backend API 120, which is described above.

In response to the request, at block B204 the network device may connect the A/V recording and communication device 100 to the user's client device 114 through the user's network 110 and the network 112. At block B206, the A/V recording and communication device 100 may record available audio and/or video data using the camera 102, the microphone 104, and/or any other device/sensor available. At block B208, the audio and/or video data is transmitted (streamed) from the A/V recording and communication device 100 to the user's client device 114 via the user's network 110 and the network 112. At block B210, the user may receive a notification on his or her client device 114 with a prompt to either accept or deny the call.

At block B212, the process determines whether the user has accepted or denied the call. If the user denies the notification, then the process advances to block B214, where the audio and/or video data is recorded and stored at a cloud server. The session then ends at block B216 and the connection between the A/V recording and communication device 100 and the user's client device 114 is terminated. If, however, the user accepts the notification, then at block B218 the user communicates with the visitor through the user's client device 114 while audio and/or video data captured by the camera 102, the microphone 104, and/or other devices/sensors is streamed to the user's client device 114. At the end of the call, the user may terminate the connection between the user's client device 114 and the A/V recording and communication device 100 and the session ends at block B216. In some embodiments, the audio and/or video data may be recorded and stored at a cloud server (block B214) even if the user accepts the notification and communicates with the visitor through the user's client device 114.

Figure 6:
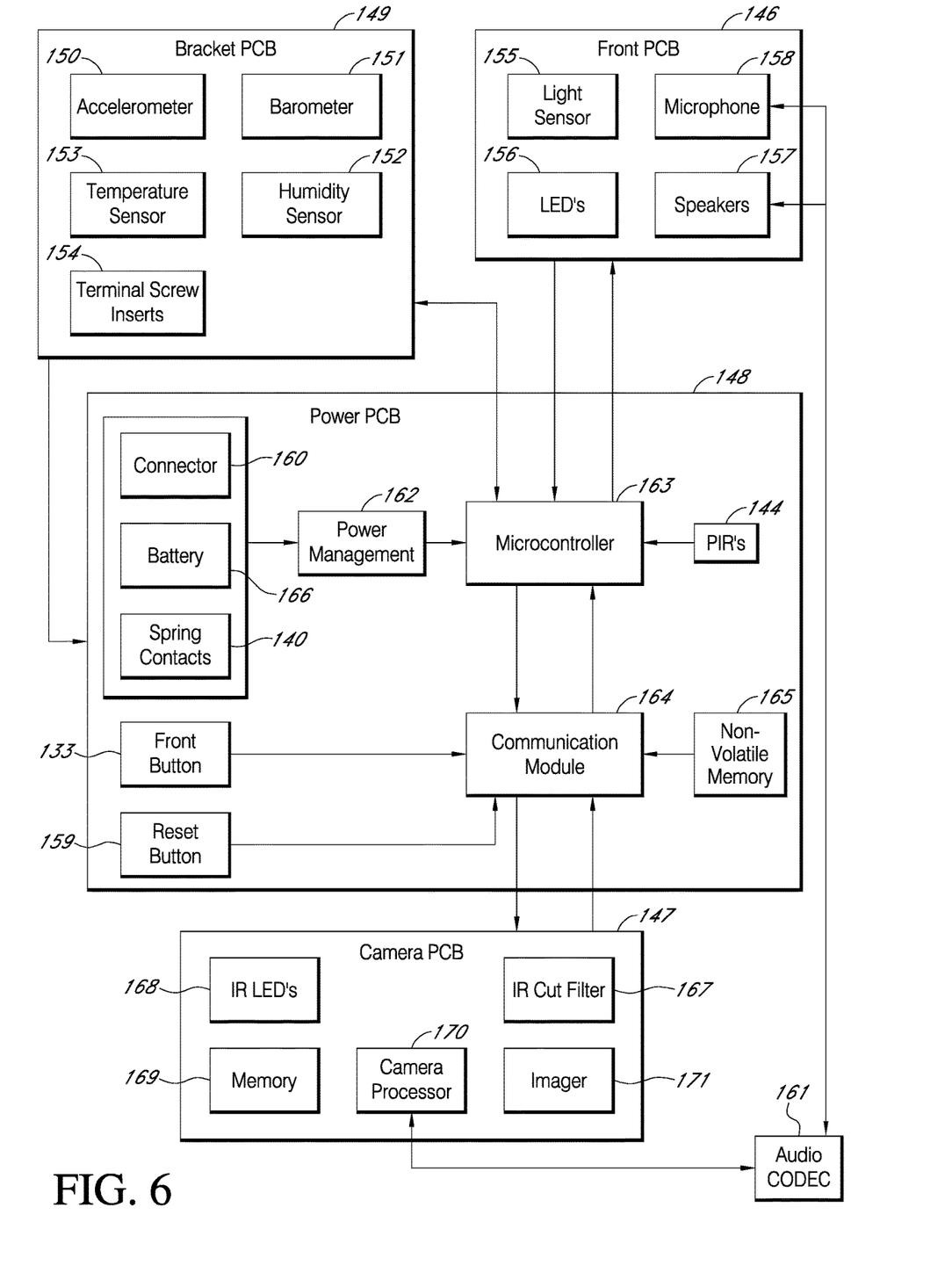
FIG. 6 is a functional block diagram of the components of an A/V recording and communication device according to various aspects of the present embodiments.

FIG. 6 is a functional block diagram of the components within or in communication with the doorbell 130, according to an aspect of the present embodiments. As described above, the bracket PCB 149 may comprise an accelerometer 150, a barometer 151, a humidity sensor 152, and a temperature sensor 153. The accelerometer 150 may be one or more sensors capable of sensing motion and/or acceleration. The barometer 151 may be one or more sensors capable of determining the atmospheric pressure of the surrounding environment in which the bracket PCB 149 may be located. The humidity sensor 152 may be one or more sensors capable of determining the amount of moisture present in the atmospheric environment in which the bracket PCB 149 may be located. The temperature sensor 153 may be one or more sensors capable of determining the temperature of the ambient environment in which the bracket PCB 149 may be located. As described above, the bracket PCB 149 may be located outside the housing of the doorbell 130 so as to reduce interference from heat, pressure, moisture, and/or other stimuli generated by the internal components of the doorbell 130.

With further reference to FIG. 6, the bracket PCB 149 may further comprise terminal screw inserts 154, which may be configured to receive the terminal screws 138 and transmit power to the electrical contacts 177 on the mounting bracket 137 (FIG. 7). The bracket PCB 149 may be electrically and/or mechanically coupled to the power PCB 148 through the terminal screws 138, the terminal screw inserts 154, the spring contacts 140, and the electrical contacts 177. The terminal screws 138 may receive electrical wires located at the surface to which the doorbell 130 is mounted, such as the wall of a building, so that the doorbell can receive electrical power from the building's electrical system. Upon the terminal screws 138 being secured within the terminal screw inserts 154, power may be transferred to the bracket PCB 149, and to all of the components associated therewith, including the electrical contacts 177. The electrical contacts 177 may transfer electrical power to the power PCB 148 by mating with the spring contacts 140.

With further reference to FIG. 6, the front PCB 146 may comprise a light sensor 155, one or more light-emitting components, such as LED's 156, one or more speakers 157, and a microphone 158. The light sensor 155 may be one or more sensors capable of detecting the level of ambient light of the surrounding environment in which the doorbell 130 may be located. LED's 156 may be one or more light-emitting diodes capable of producing visible light when supplied with power. The speakers 157 may be any electro-mechanical device capable of producing sound in response to an electrical signal input. The microphone 158 may be an acoustic-to-electric transducer or sensor capable of converting sound waves into an electrical signal. When activated, the LED's 156 may illuminate the light pipe 136 (FIG. 3). The front PCB 146 and all components thereof may be electrically coupled to the power PCB 148, thereby allowing data and/or power to be transferred to and from the power PCB 148 and the front PCB 146.

The speakers 157 and the microphone 158 may be coupled to the camera processor 170 through an audio CODEC 161. For example, the transfer of digital audio from the user's client device 114 and the speakers 157 and the microphone 158 may be compressed and decompressed using the audio CODEC 161, coupled to the camera processor 170. Once compressed by audio CODEC 161, digital audio data may be sent through the communication module 164 to the network 112, routed by one or more servers 118, and delivered to the user's client device 114. When the user speaks, after being transferred through the network 112, digital audio data is decompressed by audio CODEC 161 and emitted to the visitor via the speakers 157.

With further reference to FIG. 6, the power PCB 148 may comprise a power management module 162, a microcontroller 163 (may also be referred to as "processor," "CPU," or "controller"), the communication module 164, and power PCB non-volatile memory 165. In certain embodiments, the power management module 162 may comprise an integrated circuit capable of arbitrating between multiple voltage rails, thereby selecting the source of power for the doorbell 130. The battery 166, the spring contacts 140, and/or the connector 160 may each provide power to the power management module 162. The power management module 162 may have separate power rails dedicated to the battery 166, the spring contacts 140, and the connector 160. In one aspect of the present disclosure, the power management module 162 may continuously draw power from the battery 166 to power the doorbell 130, while at the same time routing power from the spring contacts 140 and/or the connector 160 to the battery 166, thereby allowing the battery 166 to maintain a substantially constant level of charge. Alternatively, the power management module 162 may continuously draw power from the spring contacts 140 and/or the connector 160 to power the doorbell 130, while only drawing from the battery 166 when the power from the spring contacts 140 and/or the connector 160 is low or insufficient. Still further, the battery 166 may comprise the sole source of power for the doorbell 130. In such embodiments, the spring contacts 140 may not be connected to a source of power. When the battery 166 is depleted of its charge, it may be recharged, such as by connecting a power source to the connector 160.

The power management module 162 may also serve as a conduit for data between the connector 160 and the microcontroller 163.

With further reference to FIG. 6, in certain embodiments the microcontroller 163 may comprise an integrated circuit including a processor core, memory, and programmable input/output peripherals. The microcontroller 163 may receive input signals, such as data and/or power, from the PIR sensors 144, the bracket PCB 149, the power management module 162, the light sensor 155, the microphone 158, and/or the communication module 164, and may perform various functions as further described below. When the microcontroller 163 is triggered by the PIR sensors 144, the microcontroller 163 may be triggered to perform one or more functions. When the light sensor 155 detects a low level of ambient light, the light sensor 155 may trigger the microcontroller 163 to enable "night vision," as further described below. The microcontroller 163 may also act as a conduit for data communicated between various components and the communication module 164.

With further reference to FIG. 6, the communication module 164 may comprise an integrated circuit including a processor core, memory, and programmable input/output peripherals. The communication module 164 may also be configured to transmit data wirelessly to a remote network device, and may include one or more transceivers (not shown). The wireless communication may comprise one or more wireless networks, such as, without limitation, Wi-Fi, cellular, Bluetooth, and/or satellite networks. The communication module 164 may receive inputs, such as power and/or data, from the camera PCB 147, the microcontroller 163, the button 133, the reset button 159, and/or the power PCB non-volatile memory 165. When the button 133 is pressed, the communication module 164 may be triggered to perform one or more functions. When the reset button 159 is pressed, the communication module 164 may be triggered to erase any data stored at the power PCB non-volatile memory 165 and/or at the camera PCB memory 169. The communication module 164 may also act as a conduit for data communicated between various components and the microcontroller 163. The power PCB non-volatile memory 165 may comprise flash memory configured to store and/or transmit data. For example, in certain embodiments the power PCB non-volatile memory 165 may comprise serial peripheral interface (SPI) flash memory.

With further reference to FIG. 6, the camera PCB 147 may comprise components that facilitate the operation of the camera 134. For example, an imager 171 may comprise a video recording sensor and/or a camera chip. In one aspect of the present disclosure, the imager 171 may comprise a complementary metal-oxide semiconductor (CMOS) array, and may be capable of recording high definition (e.g., 1080p or better) video files. A camera processor 170 may comprise an encoding and compression chip. In some embodiments, the camera processor 170 may comprise a bridge processor. The camera processor 170 may process video recorded by the imager 171 and audio recorded by the microphone 158, and may transform this data into a form suitable for wireless transfer by the communication module 164 to a network. The camera PCB memory 169 may comprise volatile memory that may be used when data is being buffered or encoded by the camera processor 170. For example, in certain embodiments the camera PCB memory 169 may comprise synchronous dynamic random access memory (SD RAM). IR LED's 168 may comprise light-emitting diodes capable of radiating infrared light. IR cut filter 167 may comprise a system that, when triggered, configures the imager 171 to see primarily infrared light as opposed to visible light. When the light sensor 155 detects a low level of ambient light (which may comprise a level that impedes the performance of the imager 171 in the visible spectrum), the IR LED's 168 may shine infrared light through the doorbell 130 enclosure out to the environment, and the IR cut filter 167 may enable the imager 171 to see this infrared light as it is reflected or refracted off of objects within the field of view of the doorbell. This process may provide the doorbell 130 with the "night vision" function mentioned above.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machine-readable storage device, and/or in a propagated signal, for execution by a programmable processor. Embodiments of the present method steps may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

To provide for interaction with a user, the features of the present embodiments may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present embodiments may be implemented in a computer system that includes a back-end component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

What is claimed is:

1. An audio/video recording and communication doorbell (A/V doorbell) mounting and charging system, comprising:
   a bracket having
      a rear surface that is flat for abutting a mounting surface of a structure,
      a front surface, opposite the rear surface, including a recessed receiving area sized and shaped to receive and couple with a rear surface of the A/V doorbell,
      an upper surface adjacent an upper edge of the receiving area, the upper surface including an upper recess,
      left-side and right-side surfaces adjacent left-side and right-side edges, respectively, of the receiving area, the left-side and right-side surfaces including, respectively, a left-side recess and a right-side recess, and
      at least one aperture, formed within the receiving area, sized and shaped to receive at least one screw for securing the bracket to the structure;
   an upper solar panel located within the upper recess;
   a left-side solar panel located within the left-side recess;
   a right-side solar panel located within the right-side recess;
   a charging cable operatively connected to each of the upper solar panel, the left-side solar panel, and the right-side solar panel; and a connector that mechanically and electrically couples the charging cable to the A/V doorbell when the A/V doorbell is mounted to the bracket.

2. The A/V doorbell mounting and charging system of claim 1, wherein the receiving area includes at least one device-mounting screw to secure the A/V doorbell to the bracket.

3. The A/V doorbell mounting and charging system of claim 1, wherein the receiving area includes a connector recess that accommodates the connector of the charging cable.

4. The A/V doorbell mounting and charging system of claim 1, wherein the connector of the charging cable comprises a micro-USB connector.

5. The A/V doorbell mounting and charging system of claim 1, wherein the receiving area includes a receiving area recess that accommodates a protrusion on the rear surface of the A/V doorbell.

6. The A/V doorbell mounting and charging system of claim 5, wherein the protrusion comprises a reset button.

7. The A/V doorbell mounting and charging system mounting bracket of claim 1, wherein the receiving area includes an electrically conductive contact plate.

8. The A/V doorbell mounting and charging system mounting bracket of claim 7, wherein the contact plate is coupled to at least one of a plurality of pins located on the rear surface of the A/V doorbell to indicate to the A/V doorbell that electrical power is being received from the solar panels.

9. A mounting bracket for mounting and charging an audio/video recording and communication doorbell (A/V doorbell), the mounting bracket comprising:
   a rear surface that is flat for abutting a mounting surface of a building;
   a front surface forming a recessed receiving area shaped and sized to couple with a rear surface of the A/V doorbell;
   an upper surface formed at a top edge of the mounting bracket and comprising an upper solar panel;
   left-side and right-side surfaces formed at left and right edges of the mounting bracket and comprising, respectively, a left-side solar panel and a right-side solar panel; and
   a charging cable operatively connected to each of the upper solar panel, the left-side solar panel, and the right-side solar panel;
   wherein the solar panels provide power to the A/V doorbell through the charging cable.

10. The mounting bracket of claim 9, wherein the mounting surface comprises one of a door and a wall of the building.

11. The mounting bracket of claim 10, wherein the building comprises one of a residential building and a commercial building.

12. The mounting bracket of claim 9, wherein the upper surface comprises a recess that accommodates the upper solar panel.

13. The mounting bracket of claim 9, wherein the left-side and right-side surfaces comprise left-side and right-side recesses that accommodate, respectively, the left-side solar panel and the right-side solar panel.

14. The mounting bracket of claim 9, wherein the charging cable comprises a connector that mechanically and electrically couples the charging cable to the A/V doorbell.

15. The mounting bracket of claim 14, wherein the connector of the charging cable comprises a micro-USB connector.

16. The mounting bracket of claim 9, wherein the mounting bracket forms a plurality of hooks within the receiving area that engage with a plurality of apertures on the rear surface of the A/V doorbell to mechanically couple the A/V doorbell to the mounting bracket.

17. The mounting bracket of claim 9, further comprising at least one aperture, formed within the recessed receiving area, sized and shaped to receive at least one screw for securing the mounting bracket to the building.

18. The mounting bracket of claim 9, wherein the recessed receiving area includes at least one device-mounting screw to secure the A/V doorbell to the mounting bracket.

19. The mounting bracket of claim 9, wherein the recessed receiving area includes an electrically conductive contact plate.

20. The mounting bracket of claim 19, wherein the contact plate is coupled to at least one of a plurality of pins located on the rear surface of the A/V doorbell to indicate to the A/V doorbell that electrical power is being received from the solar panels.

* * * * *